Patented June 25, 1935

2,006,182

UNITED STATES PATENT OFFICE 2,006,182

LAMINATED SAFETY GLASS

Joseph D. Ryan, Toledo, Ohio, assignor to Libbey-Owens-Ford Glass Company, Toledo, Ohio, a corporation of Ohio No Drawing. Application August 20, 1934, Serial No. 740,601

7 Claims. (Cl. 49—81)

The present invention relates to a cellulose derivative plastic including methyl phthalyl ethyl glycollate as a plasticizer for use in the manufacture of laminated safety glass.

Laminated safety glass is a composited structure composed of two sheets of glass and an interposed layer of tough, transparent plastic material adherent to the inner surfaces thereof.

Broadly speaking, the quality and life of laminated safety glass is dependent to a large degree on the plastic layer and the bonding means used in promoting adherence between the plastic material and the glass sheets. Great difficulty has been encountered in developing suitable plastics possessing not only the required degree of strength and clarity but also possessing stability toward the heat and light energy normally encountered in use. Furthermore, the manufacture of large quantities of plastic having consistent results as regards plasticizer content and other characteristics has been difficult.

The most commonly used plastics have been pyroxylin plastic and cellulose acetate plastic. Pyroxylin plastic is generally much less satisfactory than cellulose acetate plastic because of its inherent instability toward heat and light energy.

I have found that if cellulosic derivatives are plasticized with methyl phthalyl ethyl glycollate, a decidedly stable plastic results, tests showing, for example, that cellulose acetate plastic made with methyl phthalyl ethyl glycollate as a plasticizer has a remarkable stability toward light and heat energy and, furthermore, that the methyl phthalyl ethyl glycollate is a very good solvent for cellulose acetate and has an extremely high boiling point and low vapor pressure. All of these attributes are, in my opinion, highly desirable in a plasticizer for making plastic to be used for safety glass manufacture.

While the methyl phthalyl ethyl glycollate can be used for a number of cellulose derivatives, I will set forth as one specific example the making of cellulose acetate plastic therewith.

From 50 to 100 parts of the methyl phthalyl ethyl glycollate can be mixed with 100 parts of raw cellulose acetate. I have found that a mixture in the approximate proportions of 85 parts methyl phthalyl ethyl glycollate per 100 parts of raw cellulose acetate gives very excellent results.

In view of the exceedingly high stability, good solvent action, and high boiling point, low vapor pressure of the methyl phthalyl ethyl glycollate, it has marked advantages as a plasticizer for cellulose acetate over any of the plasticizers commonly used at the present time.

Because of the good solvent action of the methyl phthalyl ethyl glycollate, uniform sheets of plastic from the standpoint of plasticizer content can be produced. This is because during mixing of the ingredients and forming thereof into sheet form as well as during the subsequent handling and aging steps, relatively little plasticizer is lost.

While it is generally known that there are a large number of plasticizers that have high boiling points and low vapor pressures, the majority of these plasticizers do not have sufficiently good solvent action so that on standing the plasticizer exudes or sweats out from the plastic layer, making such plasticizers rather undesirable from this standpoint. For example, dibutyl phthalate is generally conceded to be a plasticizer having a relatively high boiling point and low vapor pressure. However, the volatility of the methyl phthalyl ethyl glycollate is, broadly speaking, only about half that of dibutyl phthalate. The solvent action of methyl phthalyl ethyl glycollate towards cellulose derivatives such as cellulose acetate is much greater than the solvent action of dibutyl phthalate at the temperature used during the making and handling of the plastic sheets in the manufacture of laminated safety glass.

In addition to cellulose acetate, methyl phthalyl ethyl glycollate can be used as an exceedingly satisfactory plasticizer for other cellulose esters of organic acids or mixed esters such as cellulose aceto butyrate and the cellulose ethers such as ethyl and benzyl cellulose.

While the proportions of plasticizer may vary to meet different conditions and when used with different cellulose derivatives, in general 50 to 100 parts of the plasticizer per 100 parts of cellulose derivative will be satisfactory. The sheeting can be made from the plasticized cellulose derivative in any preferred manner although it may be mentioned that the proportions set forth above will permit of the plastic being extruded into sheet form.

After the sheeting has been formed and aged or seasoned, if desired, to eliminate or reduce any free solvents that may be present, it is bonded to the glass sheets by any desired adhesive or other bond-inducing medium. The present invention is not concerned with the particular adhesive used and as a rule the adhesive required will depend upon the type of cellulose derivative plastic to be bonded to the glass.

It will be understood that while the methyl phthalyl ethyl glycollate can and has been used as the sole plasticizer for the cellulose derivative, nevertheless it can be used in mixtures of plasticizers if preferred.

I claim:

1. Laminated safety glass comprising two sheets of glass and an interposed layer of cellulose derivative plasticized with methyl phthalyl ethyl glycollate adherent to the inner surface thereof.

2. Laminated safety glass comprising two sheets of glass and an interposed adherent layer of cellulose derivative plastic containing some methyl phthalyl ethyl glycollate as a plasticizer therefor.

3. Laminated safety glass comprising two sheets of glass and an interposed adherent layer of cellulose derivative plastic plasticized with methyl phthalyl ethyl glycollate in the approximate proportions of 50 to 100 parts of methyl phthalyl ethyl glycollate to 100 parts of cellulose derivative.

4. Laminated safety glass comprising two sheets of glass and an interposed adherent layer of cellulose derivative plastic plasticized with methyl phthalyl ethyl glycollate in the approximate proportions of 85 parts of methyl phthalyl ethyl glycollate to 100 parts of cellulose derivative.

5. Laminated safety glass comprising two sheets of glass and an interposed layer of cellulose acetate plastic plasticized with methyl phthalyl ethyl glycollate adherent to the inner surfaces thereof.

6. Laminated safety glass comprising two sheets of glass and an interposed adherent layer of cellulose acetate plastic plasticized with methyl phthalyl ethyl glycollate in the approximate proportions of 50 to 100 parts of methyl phthalyl ethyl glycollate to 100 parts of cellulose acetate.

7. Laminated safety glass comprising two sheets of glass and an interposed adherent layer of cellulose acetate plastic plasticized with methyl phthalyl ethyl glycollate in the approximate proportions of 85 parts of methyl phthalyl ethyl glycollate to 100 parts of cellulose acetate.

JOSEPH D. RYAN.